United States Patent
Konno

(10) Patent No.: US 10,940,419 B2
(45) Date of Patent: Mar. 9, 2021

(54) HONEYCOMB FILTER

(71) Applicant: NGK Insulators, Ltd., Nagoya (JP)

(72) Inventor: Yoshiki Konno, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 66 days.

(21) Appl. No.: 16/298,188

(22) Filed: Mar. 11, 2019

(65) Prior Publication Data

US 2019/0299146 A1 Oct. 3, 2019

(30) Foreign Application Priority Data

Mar. 30, 2018 (JP) .............................. JP2018-066746

(51) Int. Cl.
*B01D 46/24* (2006.01)
*F01N 3/022* (2006.01)

(52) U.S. Cl.
CPC ....... *B01D 46/2455* (2013.01); *B01D 46/244* (2013.01); *B01D 46/2429* (2013.01); *B01D 46/2459* (2013.01); *B01D 46/2474* (2013.01); *F01N 3/0222* (2013.01); *B01D 2046/2433* (2013.01); *B01D 2046/2481* (2013.01); *B01D 2046/2496* (2013.01); *B01D 2279/30* (2013.01)

(58) Field of Classification Search
CPC .............. F01N 3/0222; B01D 46/2429; B01D 46/2455; B01D 46/2474; B01D 46/244
USPC ............................. 422/168, 177, 180; 55/523
See application file for complete search history.

(56) References Cited

U.S. PATENT DOCUMENTS

| | | | |
|---|---|---|---|
| 2009/0205303 A1 | 8/2009 | Ichikawa et al. | |
| 2011/0203242 A1* | 8/2011 | Goto | B01D 46/2474 55/523 |
| 2016/0067653 A1* | 3/2016 | Miyairi | B01D 46/2474 422/180 |

FOREIGN PATENT DOCUMENTS

JP 2009-195805 A1 9/2009

* cited by examiner

*Primary Examiner* — Tom P Duong
(74) *Attorney, Agent, or Firm* — Burr & Brown, PLLC

(57) ABSTRACT

A honeycomb filter including:
a pillar-shaped honeycomb structure including porous partition walls; and
porous plugging portions disposed on either one of end portions of each of the cells, wherein
a porosity (%) of the partition walls is defined as P1,
a porosity (%) of the plugging portions is defined as P2,
an occupancy (%) of the partition walls relative to an area of a cross section orthogonal to an extending direction of the cells of the honeycomb structure is defined as N1,
the P1 is 50 to 65%,
the P2 is 60 to 70%,
the N1 is 22 to 39%, and
X represented by Formula (1) satisfies a relation of Formula (2):

$X = P1/P2 \times N1$,    Formula (1):

$18.80 \leq -0.19X^2 + 11.33X - 121.63 \leq 50.50$.    Formula (2):

4 Claims, 3 Drawing Sheets

HONEYCOMB FILTER

The present application is an application based on JP-2018-066746 filed on Mar. 30, 2018 with Japan Patent Office, the entire contents of which are incorporated herein by reference.

BACKGROUND OF THE INVENTION

Field of the Invention

The present invention relates to a honeycomb filter. More specifically, the present invention relates to a honeycomb filter capable of effectively preventing plugging portions provided to plug open ends of cells from falling or breaking.

Description of the Related Art

As a filter for trapping particulate matters in exhaust gas emitted from an internal combustion engine such as a diesel engine or as an apparatus for purifying poisonous gaseous components such as CO, HC, and NOx, a honeycomb filter having a honeycomb structure has been used (see Patent Document 1). The honeycomb structure has partition walls formed from a porous ceramic such as cordierite and silicon carbide, and the partition walls define a plurality of cells. The honeycomb filter has such a honeycomb structure as described above, and in the honeycomb structure, plugging portions are so disposed as to alternately plug open ends on a side of the inflow end face of a plurality of cells and open ends on a side of the outflow end face of a plurality of cells. In other words, the honeycomb filter has the structure in which inflow cells that is open at a side of the inflow end face and is plugged at side of the out flow end face, and outflow cells that is plugged at a side of the inflow end face and is open at a side of the out flow end face are alternately arranged via the partition walls. In the honeycomb filter, the porous partition walls of the honeycomb structure function as a filter for trapping particulate matters in exhaust gas. Hereinafter, the particulate matter contained in exhaust gas is also called "PM". "PM" is the abbreviation of "particulate matter".

[Patent Document 1] JP-A-2009-195805

SUMMARY OF THE INVENTION

Conventional honeycomb filters have a problem of easy falling of plugging portions from ends of cells. Even when plugging portions do not fall, the plugging portions may break due to various stresses applied to a honeycomb filter, unfortunately.

For example, when a honeycomb filter continuously traps particulate matters in exhaust gas emitted from an automobile engine or the like, ash accumulates therein. To address this, cleaning by backwashing with a back-blow of high-pressure air, which is called an ash cleaning, may be periodically performed. When such an ash cleaning is conducted, the pressure of a high-pressure air may cause plugging portions to fall from end portions of cells or may cause plugging portions to break.

To use a honeycomb filter as a filter for purifying an exhaust gas, the honeycomb filter may be stored in a can such as a metal case. Storing a honeycomb filter in a can such as a metal case may be called canning. For the canning of a honeycomb filter, a surface pressure is applied onto the circumferential face of the honeycomb filter through a holding material such as a mat, and the honeycomb filter is held in a can. Also during such canning, plugging portions may fall from ends of cells or plugging portions may break.

In addition, a honeycomb filter is used in an environment where the honeycomb filter is exposed to exhaust gas at high temperature, thus the honeycomb filter inevitably has a temperature gradient, and a thermal stress is generated. In such a condition, the stress is likely to concentrate on the boundary between partition walls provided to surround cells and plugging portions disposed on end portions of the cells, and the plugging portions may fall from end portions of the cells or plugging portions may break.

In view of the above circumstances, the present invention has been made. The present invention is intended to provide a honeycomb filter capable of effectively preventing plugging portions disposed to plug open ends of cells from falling or breaking.

According to the present invention, the following honeycomb filters are provided.

According to a first aspect of the present invention, a honeycomb filter is provided which includes a pillar-shaped honeycomb structure including porous partition walls provided to surround a plurality of cells serving as fluid passages extending from an inflow end face to an outflow end face, and porous plugging portions disposed on either one of end portions of each of the cells on the side of the inflow end face or the side of the outflow end face, wherein a porosity (%) of the partition walls is defined as P1, a porosity (%) of the plugging portions is defined as P2, an occupancy (%) of the partition walls relative to an area of a cross section orthogonal to an extending direction of the cells of the honeycomb structure is defined as N1, the P1 is 50 to 65%, the P2 is 60 to 70%, the N1 is 22 to 39%, and X represented by Formula (1) satisfies a relation of Formula (2):

$$X = P1/P2 \times N1, \qquad \text{Formula (1):}$$

$$18.80 \leq -0.19X^2 + 11.33X - 121.63 \leq 50.50. \qquad \text{Formula (2):}$$

According to a second aspect of the present invention, the honeycomb filter according to the aspect is provided, wherein a thickness of the partition walls is 0.178 to 0.318 mm.

According to a third aspect of the invention, the honeycomb filter according to the first or second aspects is provided, wherein a porosity ratio (P1/P2) being the value of the ratio of the P1 to the P2 is 0.69 to 1.07.

According to a fourth aspect of the present invention, the honeycomb filter according to any one of the first to third aspects is provided, wherein a length of the plugging portions in the extending direction of the cells is 2 to 15 mm.

The honeycomb filter of the present invention can effectively prevent plugging portions disposed to plug open ends of cells from falling or breaking. In other words, by setting X represented by Formula (1) to satisfy the relation of Formula (2), a porous body forming the partition walls can satisfactory engage with a porous body forming the plugging portions on the interface therebetween, and the plugging portions can be effectively prevented from falling. Formula (1) includes, as a variable, the occupancy N1(%) of partition walls relative to the area of a cross section orthogonal to the cell extending direction of a honeycomb structure, and thus plugging portions can be prevented from falling or breaking depending on the cell structure of a honeycomb structure.

DESCRIPTION OF THE PREFERRED EMBODIMENTS

Embodiments of the present invention will now be described, but the present invention is not intended to be limited to the following embodiments. It should therefore be understood that changes, improvements, and other modifications appropriately made in the embodiments described below on the basis of ordinary knowledge of a person skilled in the art are also encompassed in the present invention without departing from the scope of the present invention.

Figure 1:
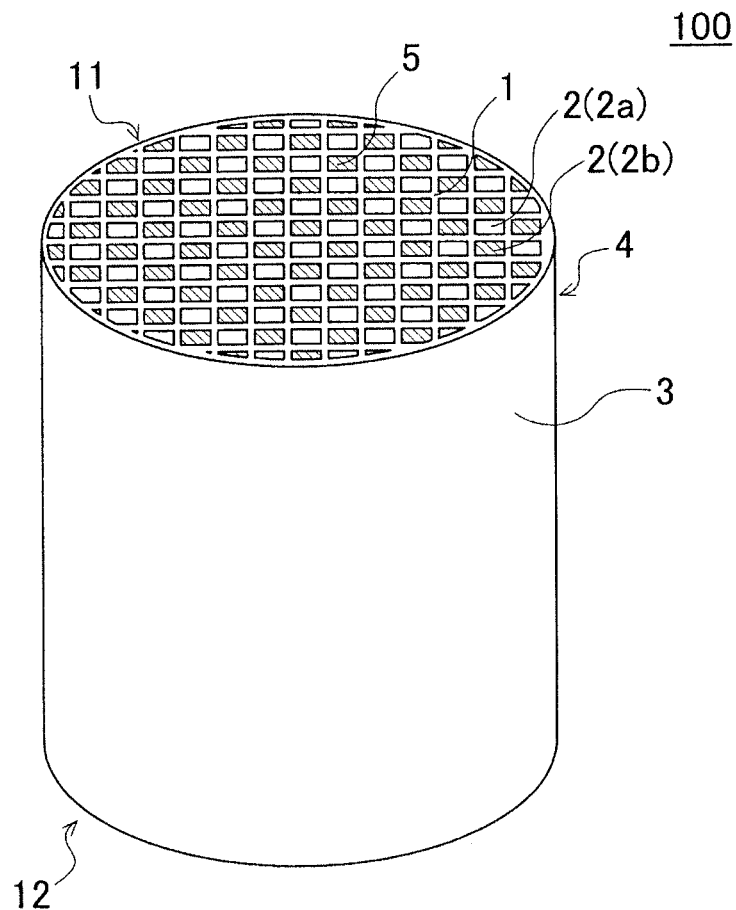
FIG. 1 is a schematic perspective view showing an embodiment of a honeycomb filter of the present invention.
Figure 2:
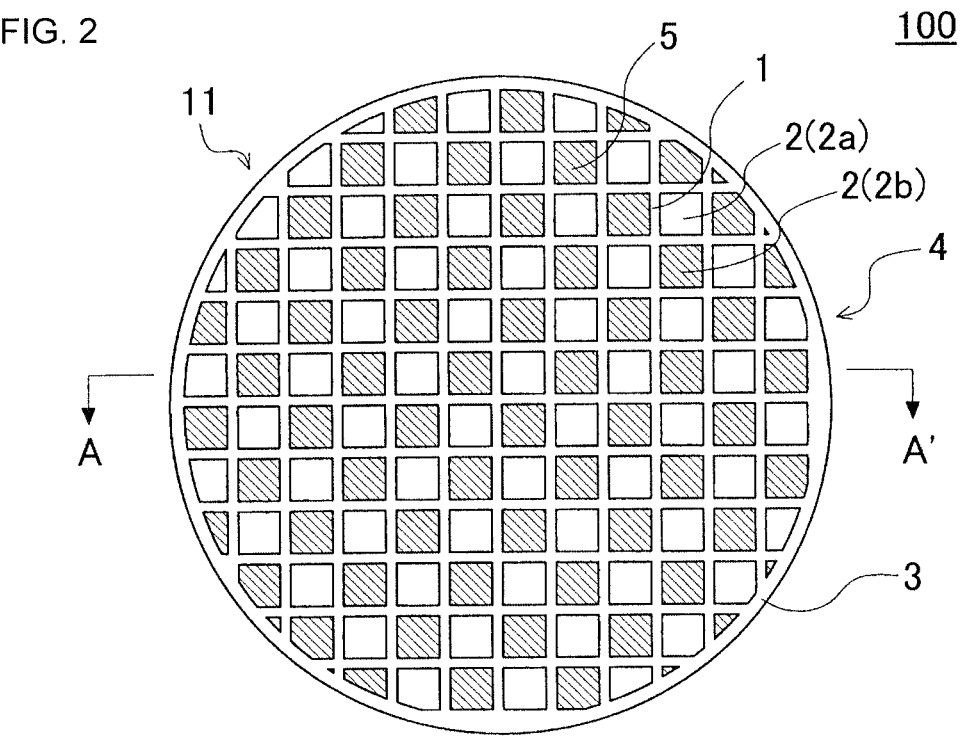
FIG. 2 is a plan view showing a side of an inflow end face of the honeycomb filter shown in FIG. 1.
Figure 3:
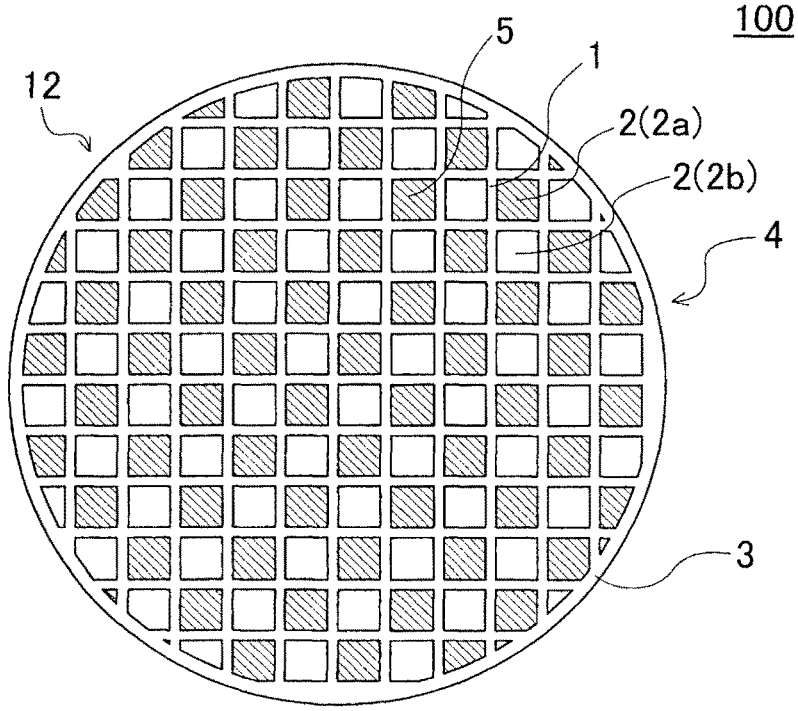
FIG. 3 is a plan view showing a side of an outflow end face of the honeycomb filter shown in FIG. 1.
Figure 4:
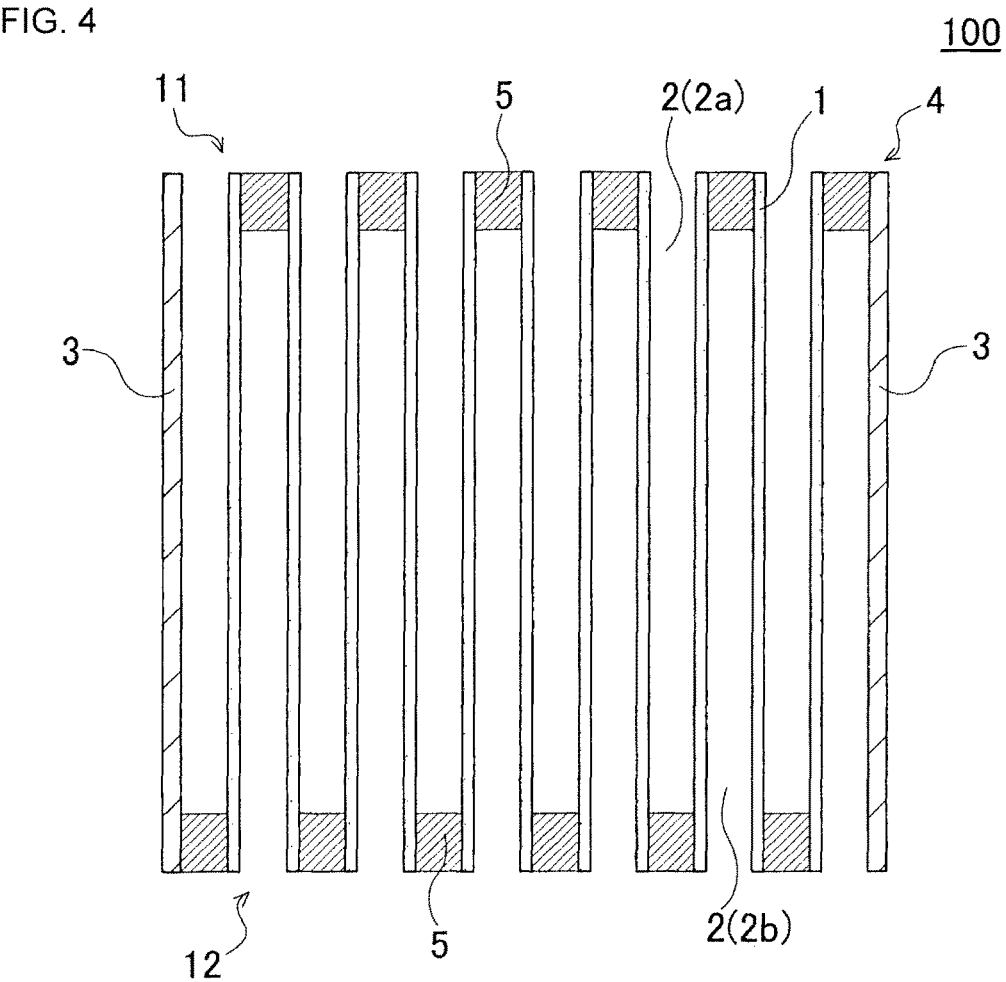
FIG. 4 is a schematic sectional view taken along the line A-A' in FIG. 2.

(1) Honeycomb Filter:

An embodiment of the honeycomb filter of the present invention is a honeycomb filter 100 as shown in FIG. 1 to FIG. 4. FIG. 1 is a schematic perspective view showing an embodiment of the honeycomb filter of the present invention. FIG. 2 is a plan view showing a side of an inflow end face of the honeycomb filter shown in FIG. 1. FIG. 3 is a plan view showing a side of an outflow end face of the honeycomb filter shown in FIG. 1. FIG. 4 is a schematic sectional view taken along the line A-A' in FIG. 2.

As shown in FIG. 1 to FIG. 4, the honeycomb filter 100 includes a honeycomb structure 4 and plugging portions 5. The honeycomb structure 4 has porous partition walls 1 disposed to surround a plurality of cells 2 serving as fluid passages extending from an inflow end face 11 to an outflow end face 12. The honeycomb structure 4 is a pillar-shaped structure having the inflow end face 11 and the outflow end face 12 as the respective end faces. In the honeycomb filter 100 of the embodiment, the honeycomb structure 4 further has, on the circumferential side face thereof a circumferential wall 3 disposed to surround the partition walls 1.

plugging portion 5 is disposed on either one of end portions of each of the cells 2 on the side of the inflow end face 11 or the side of the outflow end face 12 and plugs each of the open ends of the cells 2. The plugging portions 5 are porous and are formed from a porous material. In the honeycomb filter 100 shown in FIG. 1 to FIG. 4, each of predetermined cells 2 having plugging portions 5 at the end portion on the side of the inflow end face 11 and each of the residual cells 2 having plugging portions 5 at the end portion on the side of the outflow end face 12 are alternately arranged via the partition walls 1. Hereinafter, a cell 2 disposing a plugging portion 5 at the end portion on the side of the inflow end face 11 may be referred to as "outflow cell $2b$". A cell 2 disposing a plugging portion 5 at the end portion on the side of the outflow end face 12 may be referred to as "inflow cell $2a$".

The honeycomb filter 100 of the embodiment has an important feature on three requirements of the porosity (%) of the partition walls 1, the porosity (%) of the plugging portions 5, and the occupancy (%) of the partition walls 1 relative to the area of a cross section orthogonal to the extending direction of the cells 2 of the honeycomb structure 4. Hereinafter, the porosity (%) of partition walls 1 is defined as P1, the porosity (%) of plugging portions 5 is defined as P2, and the occupancy (%) of partition walls 1 relative to the area of a cross section orthogonal to the extending direction of the cells 2 of a honeycomb structure 4 is defined as N1. P1 is 50 to 65%. P2 is 60 to 70%. N1 is 22 to 39%. In the honeycomb filter 100 of the embodiment, X represented by Formula (1) satisfies the relation of Formula (2). Hereinafter, P1 is also referred to as "porosity P1 of partition walls 1", P2 is also referred to as "porosity P2 of plugging portions 5", and N1 is also referred to as "occupancy N1 of partition walls 1".

$$X = P1/P2 \times N1 \quad \text{Formula (1):}$$

$$18.80 \leq -0.19X^2 + 11.33X - 121.63 \leq 50.50 \quad \text{Formula (2):}$$

In a honeycomb filter satisfying such requirements, plugging portions 5 disposed to plug open ends of cells 2 can be effectively prevented from falling or breaking. In other words, by setting X represented by Formula (1) to satisfy the relation of Formula (2), a porous body forming the partition wall 1 can satisfactory engage with a porous body forming the plugging portions 5 on the interface therebetween, and the plugging portions 5 can be effectively prevented from falling. Formula (1) includes the occupancy N1(%) of a partition wall 1 as a variable, and thus plugging portions 5 can be prevented from falling or breaking depending on the cell structure of a honeycomb structure 4.

If the value of "$-0.19X^2 + 11.33X - 121.63$" represented by Formula (2) is less than 18.80, plugging portions 5 are likely to fall. If the above value is more than 50.50, plugging portions 5 are unlikely to fall, but partition walls 1 have an insufficient strength against an external force in the state in which the partition walls 1 are bonded to the plugging portions 5, and the partition walls 1 may break at bonded portions to the plugging portions 5.

Formula (2) is a quadratic function for X represented by Formula (1), and easiness of falling of plugging portions 5 can be expressed as the quadratic function for X where P1, P2, and N1 are defined as variables. Although not particularly limited, the value of "$-0.19X^2 + 11.33X - 121.63$" is preferably 26.50 to 50.50 and more preferably 38.80 to 50.50. By setting the value as above, the plugging portions 5 can be more effectively prevented from falling.

Next, the measurement methods of the porosity P1 of partition walls 1, the porosity P2 of plugging portions 5, and the occupancy N1 of partition walls 1 will be described below.

The porosity P1 of partition walls 1 is determined by a mercury porosimetry. The porosity P1 of partition walls 1 can be determined by using AutoPore 9500 (trade name) manufactured by Micromeritics, for example. The porosity P1 of partition walls 1 can be determined by using a test piece prepared by partially cutting the partition walls 1 out from a honeycomb structure 4.

The porosity P2 of plugging portions 5 is determined by a mercury porosimetry. The porosity P2 of plugging portions 5 can be determined in a similar manner to that for the measurement of the porosity P1 of partition walls 1.

To determine the occupancy N1 of partition walls 1, firstly, the open frontal area OFA (%) of the cells 2 in a honeycomb structure 4 is calculated. Specifically, the total area S1 of a cross section orthogonal to the extending direction of the cells of a honeycomb structure 4 is determined. Next, the area S2 of the open portions of the cells 2 in the cross section is determined. The percentage of the value obtained by dividing the area S2 by the total area S1 is the "open frontal area OFA (%) of the cells 2 of the honeycomb structure 4". The occupancy N1 of the partition walls 1 can be calculated in accordance with "100%−open frontal area OFA (%)". The total area S1 and the area S2 can be determined with NEXIV (trade name) manufactured by NIKON CORPORATION, for example.
a cross section orthogonal to the extending direction of the cells The porosity ratio (P1/P2) that is the value of the ratio of the porosity P1 of the partition walls 1 to the porosity P2 of the plugging portions 5 is preferably 0.69 to 1.07, more preferably 0.83 to 1.07, and particularly preferably 0.84 to 1.07. By setting the ratio as above, the plugging portions 5 can be more effectively prevented from falling.

The plugging portions 5 may have any length in the extending direction of the cells 2. For example, each plugging portion 5 preferably has a length of 3 to 10 mm and more preferably 7 to 10 mm in the extending direction of the cells 2. By setting the value as above, the plugging portions 5 can be more effectively prevented from falling.

In the honeycomb structure 4, each of the partition walls 1 preferably has a thickness of 0.178 to 0.318 mm, more preferably 0.203 to 0.318 mm, and particularly preferably 0.254 to 0.318 mm. The thickness of each of partition walls 1 can be determined by using a scanning electron microscope or a microscope, for example. If the thickness of each of partition walls 1 is less than 0.178 mm, sufficient strength may not be achieved. If the thickness of each of partition walls 1 is more than 0.318 mm, the pressure loss of such a honeycomb filter 100 may increase.

The shape of each of cells 2 defined by the partition walls 1 is not specifically restricted. Examples of the shape of the cells 2 in a cross section orthogonal to the extending direction of the cells 2 include a polygonal shape, a circular shape, and an elliptical shape. Examples of the polygonal shape include a triangular shape, a quadrangular shape, a pentagonal shape, a hexagonal shape, and an octagonal shape. The shape of the cells 2 is preferably a triangular shape, a quadrangular shape, a pentagonal shape, a hexagonal shape, or an octagonal shape. As for the shape of the cells 2, all the cells 2 may have the same shape, or the cells 2 may have different shapes. For example, not shown in the drawings, quadrangular cells and octagonal cells may be mixed. As for the size of the cells 2, all the cells 2 may have the same size, or the cells 2 may have different sizes. For example, not shown in the drawings, of a plurality of cells, some cells may have a larger size, and the other cells may have a smaller size. In the present invention, a cell means a space surrounded by partition walls.

The cell density of the cells 2 defined by the partition walls 1 is preferably 23 to 47 cells/cm$^2$ and more preferably 31 to 47 cells/cm$^2$. When having such a structure, the honeycomb filter 100 can maintain the PM trapping performance and can suppress an increase in pressure loss.

The circumferential wall 3 of the honeycomb structure 4 may be formed monolithically with the partition walls 1 or may be a circumferential coating layer formed by applying a circumferential coating material so as to surround the partition walls 1. Not shown in the drawings, the circumferential coating layer can be disposed as follows in a production process: partition walls and a circumferential wall are monolithically formed, then the formed circumferential wall is removed by a known technique such as grinding, and a circumferential coating layer is disposed on the side of the circumference of the partition walls.

The shape of honeycomb structure 4 is not specifically restricted. Examples of the shape of the honeycomb structure 4 include a pillar shape in which an inflow end face 11 and an outflow end face 12 have a circular shape, an elliptical shape, a polygonal shape, or the like.

The sizes of the honeycomb structure 4, for example, the length from the inflow end face 11 to the outflow end face 12, and the size of a cross section orthogonal to the extending direction of the cells 2 in the honeycomb structure 4 are not specifically restricted. Each size can be appropriately set so as to achieve the optimum purification performance when the honeycomb filter 100 is used as a filter for purifying exhaust gas. For example, the length of the honeycomb structure 4 from the inflow end face 11 to the outflow end face 12 is preferably 101.6 to 254.0 mm and more preferably 152.4 to 254.0 mm. The area of a cross section orthogonal to the extending direction of the cells 2 of the honeycomb structure 4 is preferably 64930.7 to 342534.3 mm$^2$ and more preferably 114009.2 to 342534.3 mm$^2$.

The material of partition walls 1 is not specifically restricted. For example, the material of the partition walls 1 preferably includes at least one selected from the group consisting of silicon carbide, cordierite, a silicon-silicon carbide composite material, a cordierite-silicon carbide composite material, silicon nitride, mullite, alumina, and aluminum titanate.

The material of plugging portions 5 is not specifically restricted. For example, a similar material to the above materials of the partition walls 1 can be used.

(2) Method for Manufacturing a Honeycomb Filter:

The method for manufacturing the honeycomb filter of the present invention is not specifically restricted, for example, the method can include the following method. First, a kneaded material having plasticity is prepared to obtain a honeycomb structure. The kneaded material to prepare the honeycomb structure can be prepared by suitably adding an additive such as a binder, a pore former, and water to a raw material powder of a material selected from the group consisting of the above mentioned suitable materials of the partition walls. For example, the porosity of the partition walls of a honeycomb filter to be produced can be adjusted by the amount of a pore former.

Next, by means of the extrusion of the prepared kneaded material, a pillar-shaped honeycomb formed body including partition walls defining a plurality of cells and including a circumferential wall disposed to surround the partition walls. The obtained honeycomb formed body is subsequently dried by microwaves and hot air, for example.

Next, at the open ends of the cells of the dried honeycomb formed body, plugging portions are disposed. Specifically, masks are applied onto the inflow end face of the honeycomb formed body so as to cover the inflow cells. The end of the honeycomb formed body with the masks is then immersed in a plugging slurry, and the open ends of outflow cells without the masks are filled with the plugging slurry. The same process as above is subsequently performed for the outflow end face of the honeycomb formed body to fill the open ends of the inflow cells with a plugging slurry.

To manufacture the honeycomb filter of the present invention, the porosity of the plugging portions of a honeycomb filter to be produced is preferably adjusted by adding a pore former such as a foamable resin to prepare a plugging slurry. By using such a process, the honeycomb filter satisfying Formula (2) can be simply manufactured.

Next, the honeycomb formed body having the plugging portions disposed at either one open end of a cell is burned to obtain the honeycomb filter of the present invention. The burning temperature and the burning atmosphere vary with raw materials, and a person skilled in the art can select the burning temperature and the burning atmosphere suitable for a selected material.

EXAMPLES

The present invention will be more specifically described hereinafter with reference to examples, but the present invention is not intended to be limited to these examples.

Example 1

To 100 parts by mass of a cordierite forming raw material, 5 parts by mass of a pore former, 40 parts by mass of a dispersing medium, and 5 parts by mass of an organic binder were added, and the whole was mixed and kneaded to prepare a kneaded material. Alumina, aluminum hydroxide, kaolin, talc, and silica were used as the cordierite forming raw material. Water was used as the dispersing medium. Methylcellulose was used as the organic binder. Dextrin was used as the dispersing agent. A foamable resin having an average particle diameter of 13 μm was used as the pore former.

Next, the kneaded material was extruded by using a die for preparing a honeycomb formed body, a honeycomb formed body having a round pillar shape as a whole was obtained. The shape of the cell in the honeycomb formed body was a quadrangular shape.

The honeycomb formed body was then dried in a microwave dryer and further completely dried in a hot-air drier. Both end faces of the honeycomb formed body were cut down for adjustment to a predetermined size.

Next, a plugging slurry was prepared to form plugging portions. For the plugging slurry, similar materials to the materials used for the preparation of the kneaded material were used, and the amount of the foamable resin as the pore former was so adjusted that the plugging portions would have a desired porosity.

Next, the above plugging slurry was used to form plugging portions at open ends of cells on the side of the inflow end face of the dried honeycomb formed body. Specifically, masking was performed to the inflow end face of the honeycomb formed body so as to cover inflow cells. The end portion where masking was performed of the honeycomb formed body was then immersed in a plugging slurry, and the open ends where masking was not performed of the outflow cells were filled with the plugging slurry. Next, masking was performed to the outflow end face of the honeycomb formed body so as to cover the outflow cells. The end portion where masking was performed of the honeycomb formed body was then immersed in a plugging slurry, and the open ends where masking was not performed of the inflow cells were filled with the plugging slurry. As described above, the plugging portions were also forming at the open ends of the cells on the side of the outflow end face of the dried honeycomb formed body.

Next, the honeycomb formed body where the plugging portions were formed was degreased and burned to manufacture a honeycomb filter of Example 1.

The honeycomb filter of Example 1 had a round pillar shape whose inflow end face and outflow end face had a circular shape. Each diameter of the inflow end face and the outflow end face was 266.7 mm. The length of the honeycomb filter in the cell extending direction was 254.0 mm. In the honeycomb filter of Example 1, a porosity P1 of the partition wall was 50%. The porosity P1 of the partition wall was determined by using AutoPore 9500 (trade name) manufactured by Micromeritics. In the honeycomb filter, a thickness of a partition wall was 0.318 mm and a cell density was 31 cells/cm$^2$, and an occupancy N1 of a partition wall of the honeycomb structure had was 32.2%. The porosity P1 of the partition wall and the occupancy N1 of the partition wall are shown in Table 1.

In the honeycomb filter of Example 1, a porosity P2 of the plugging portions was 60%. The porosity P2 of the plugging portions was determined by using AutoPore 9500 (trade name) manufactured by Micromeritics.

In the honeycomb filter of Example 1, the porosity ratio (P1/P2) that is the value of the ratio of the porosity P1 of the partition walls to the porosity P2 of the plugging portions was 0.83. The value of X represented by Formula (1) was 26.8. The value of "$-0.19X^2+11.33X-121.63$" in Formula (2) was 49.5. The values are shown in Table 1.

The "falling strength of plugging portions" and "falling evaluation of plugging portions" of the honeycomb filter of Example 1 were evaluated by the following methods. The results are shown in Table 1.

(Falling Strength of Plugging Portions)

First, in the honeycomb filter of Example 1, a part with 30 mm from the inflow end face was cut off to prepare a test piece for measuring the falling strength of plugging portions. A universal tester (model: 3366) manufactured by INSTRON was used to measure the falling strength of the plugging portions of the test piece. For the measurement, a stainless-steel push-out pin having a diameter of 1.0 mm was pressed against a plugging portion of the test piece, and the stress was measured when the plugging portion fell from the partition wall.

(Falling Evaluation of Plugging Portions)

The same test pieces as the test pieces used for the measurement of the falling strength of plugging portions were used to carry out an ash cleaning test by the following methods. In the ash cleaning test, those test pieces from which no plugging portion fell are evaluated as acceptable and is designated by "OK" shown in Table 1. In the ash cleaning test, those test pieces from which plugging portions fell are evaluated as unacceptable and is designated by "NG" shown in Table 1. The ash cleaning test was conducted as follows: an air at a pressure of 0.67 MPa was applied through an air nozzle to a honeycomb filter from the outflow end face toward the inflow end face, and the ash in the honeycomb filter was blown away and removed.

TABLE 1

|  | Partition wall thickness (mm) | Partition wall porosity P1 (%) | Plugging portion porosity P2 (%) | Porosity ratio (P1/P2) | Partition wall occupancy (%) | X (P1/P2 × N1) | Value of Formula (2) | Falling strength of plugging portions (MPa) | Falling evaluation |
|---|---|---|---|---|---|---|---|---|---|
| Example 1 | 0.318 | 50 | 60 | 0.83 | 32.2 | 26.8 | 49.5 | 47.6 | OK |
| Comparative Example 1 | 0.203 | 53 | 77 | 0.69 | 22.6 | 15.6 | 11.1 | 12.2 | NG |

TABLE 1-continued

|  | Partition wall thickness (mm) | Partition wall porosity P1 (%) | Plugging portion porosity P2 (%) | Porosity ratio (P1/P2) | Partition wall occupancy (%) | X (P1/P2 × N1) | Value of Formula (2) | Falling strength of plugging portions (MPa) | Falling evaluation |
|---|---|---|---|---|---|---|---|---|---|
| Example 2 | 0.203 | 58 | 64 | 0.91 | 22.6 | 20.5 | 33.7 | 24.2 | OK |
| Example 3 | 0.203 | 58 | 65 | 0.89 | 22.6 | 20.2 | 32.5 | 26.5 | OK |
| Example 4 | 0.203 | 58 | 62 | 0.94 | 22.6 | 21.1 | 36.0 | 33.8 | OK |
| Comparative Example 2 | 0.203 | 58 | 77 | 0.75 | 22.6 | 17.0 | 18.8 | 13.4 | NG |
| Example 5 | 0.203 | 58 | 70 | 0.83 | 22.6 | 18.7 | 26.7 | 21.2 | OK |
| Comparative Example 3 | 0.203 | 58 | 78 | 0.74 | 22.6 | 16.8 | 17.7 | 12 | NG |
| Example 6 | 0.203 | 58 | 66 | 0.88 | 22.6 | 19.9 | 31.3 | 29.4 | OK |
| Example 7 | 0.318 | 52 | 61 | 0.85 | 38.6 | 32.9 | 50.5 | 48.8 | OK |
| Example 8 | 0.318 | 65 | 61 | 1.07 | 38.6 | 41.1 | 29.8 | 23.6 | OK |
| Example 9 | 0.178 | 58 | 65 | 0.89 | 23.6 | 21.1 | 35.7 | 23 | OK |
| Comparative Example 4 | 0.178 | 58 | 80 | 0.73 | 23.6 | 17.1 | 19.2 | 12 | NG |
| Comparative Example 5 | 0.305 | 70 | 50 | 1.40 | 32.2 | 45.1 | 10.9 | 8 | NG |
| Comparative Example 6 | 0.152 | 50 | 60 | 0.83 | 18 | 15.0 | 7.9 | 7.9 | NG |
| Comparative Example 7 | 0.432 | 55 | 60 | 0.92 | 50 | 45.8 | 6.6 | 6.6 | NG |
| Comparative Example 8 | 0.203 | 50 | 70 | 0.71 | 22.6 | 16.1 | 14.2 | 14.2 | NG |
| Example 10 | 0.318 | 65 | 60 | 1.08 | 38.6 | 41.8 | 27.0 | 27.0 | OK |

TABLE 2

|  | Partition wall thickness (mm) | Partition wall porosity P1 (%) | Plugging portion porosity P2 (%) | Porosity ratio (P1/P2) | Partition wall occupancy (%) | X (P1/P2 × N1) | Value of Formula (2) | Pressure loss (kPa) | Pressure loss ratio (%) | Pressure loss evaluation |
|---|---|---|---|---|---|---|---|---|---|---|
| Example 1 | 0.318 | 50 | 60 | 0.83 | 32.2 | 26.8 | 49.5 | 1.00 | 1.11 | OK |
| Comparative Example 9 | 0.318 | 58 | 64 | 0.91 | 32.2 | 29.2 | 51.5 | 0.90 | — | — |
| Example 2 | 0.203 | 58 | 64 | 0.91 | 22.6 | 20.5 | 33.7 | 0.70 | 1.06 | OK |
| Comparative Example 10 | 0.203 | 53 | 77 | 0.69 | 22 | 15.1 | 8.7 | 0.66 | — | — |
| Example 3 | 0.178 | 58 | 65 | 0.89 | 24 | 21.4 | 37.0 | 1.00 | 1.02 | OK |
| Comparative Example 11 | 0.178 | 70 | 50 | 1.40 | 24 | 33.6 | 49.7 | 0.98 | — | — |

Examples 2 to 10

The porosity P1 of partition walls, the porosity P2 of plugging portions, and the occupancy N1 of partition walls were changed as shown in Table 1 to prepare honeycomb filters of Examples 2 to 10. The porosity P1 of partition walls was adjusted by changing the amount of the foamable resin as the pore former added to a cordierite forming raw material for preparing a kneaded material. The porosity P2 of plugging portions was also adjusted by changing the amount of the foamable resin as the pore former. The occupancy N1 of partition walls was adjusted by changing the slit width for forming partition walls in a die used for extrusion.

Comparative Examples 1 to 11

The porosity P1 of partition walls, the porosity P2 of plugging portions, and the occupancy N1 of partition walls were changed as shown in Table 1 and Table 2 to prepare honeycomb filters of Comparative Examples 1 to 11. The porosity P1 of partition walls, the porosity P2 of plugging portions, and the occupancy N1 of partition walls were adjusted by changing the amount of the foamable resin and the like in the same manner as in Examples 2 to 10.

As to the honeycomb filters of Examples 2 to 10 and Comparative Examples 1 to 8, the measurement of "falling strength of plugging portions" and "falling evaluation of plugging portions" were conducted in the same manner as in Example 1. Table 1 shows the results.

As to the honeycomb filters of Examples 1 to 3, the measurement of a pressure loss by the following methods. As to the honeycomb filters of Comparative Examples 9 to 11 used as the references, the measurement of a pressure loss was also conducted in the same methods.

(Pressure Loss)

Firstly, a honeycomb filter was stored in a metal storage container, and the storage container was attached to the tip of a burner test apparatus that burned LP gas. Next, the temperature of the gas emitted from the burner test apparatus was set at 200° C., and the gas was allowed to pass from the inflow end face side of a honeycomb filter at a flow rate of 6.2 m$^3$/min. The differential pressure between the pressure on the side of the inflow end face and the pressure on the side of the outflow end face was calculated as the pressure loss (kPa) of the honeycomb filter. Next, the ratios of the pressure loss values of the Examples 1 to 3 to the pressure loss values of Comparative Examples 9 to 11 used as the references were calculated. Comparative Example used as the reference to Example 1 was Comparative Example 9. Comparative Example used as the reference to Example 2 was Comparative Example 10. Comparative Example used as the reference to Example 3 was Comparative Example 11. The results are shown in the columns of "pressure loss" and "pressure loss ratio" in Table 2.

As to the pressure loss ratio, pressure loss evaluations were conducted on the basis of the following criteria. The pressure loss ratio of 1.15 or less is evaluated as acceptable and is designated by "OK" shown in Table 2. The pressure loss ratio of more than 1.15 is evaluated as unacceptable.

(Results)

In each of honeycomb filters of Examples 1 to 10, the value of "$-0.19X^2+11.33X-121.63$" that is the value of Formula (2) was within a range of 18.80 to 50.50, the falling strength of plugging portions was high, and the falling evaluation of plugging portions resulted in "OK". In contrast, in each of honeycomb filters of Comparative Examples 1, 3, and 5 to 8, the value of "$-0.19X^2+11.33X-121.63$" that is the value of Formula (2) was out of a range of 18.80 to 50.50, the falling strength of plugging portions was low, and the falling evaluation of plugging portions was resulted in "NG". In addition to the value of Formula (2), when the porosity P1 of partition walls was out of a range of 50 to 65%, or the porosity P2 of plugging portions was out of a range of 60 to 70%, the falling evaluation of plugging portions was resulted in "NG". When the falling evaluation of plugging portions resulted in "OK", a sufficient trapping performance should be achieved as a filter for trapping particulate matters in exhaust gas. It was also found that the honeycomb filters of Examples 1 to 3 enabled to suppress an excess increase in a pressure loss as compared with the honeycomb filters of Comparative Examples 9 to 11.

Figure 5:
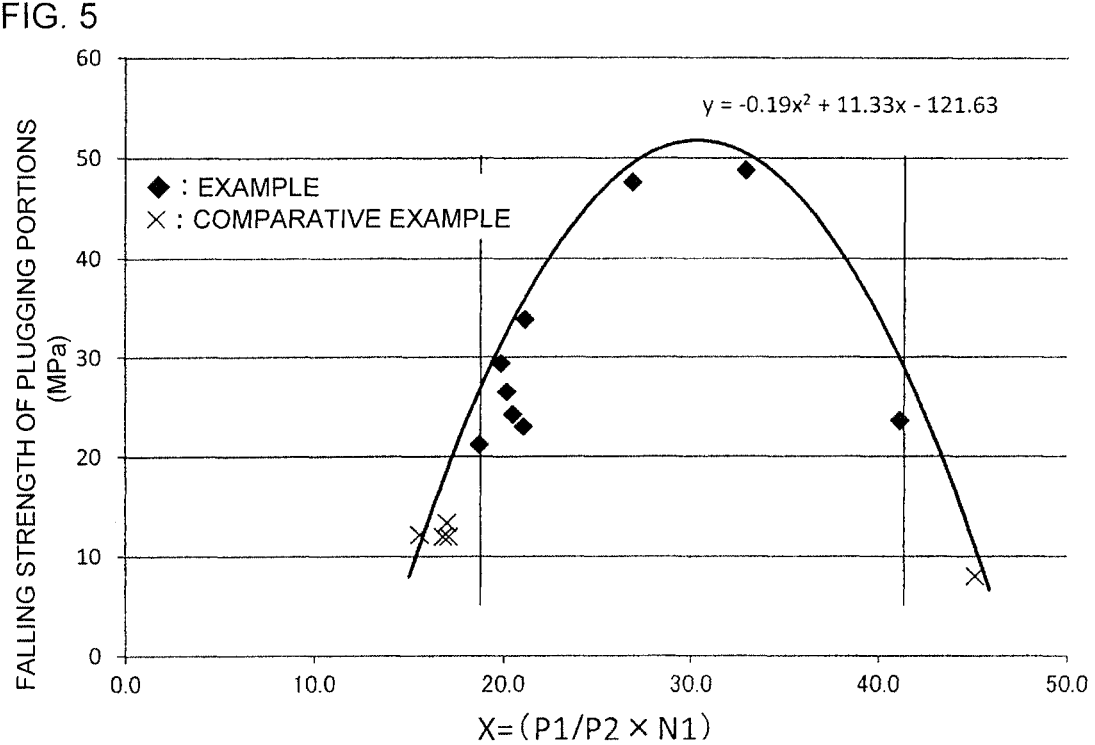
FIG. 5 is a graph showing the relation between X values (i.e., values of (P1/P2×N1)) and falling strengths (MPa) of plugging portions in Examples 1 to 9 and Comparative Examples 1 to 5.

On the basis of the results of the embodiments, "$-0.19X^2+11.33X-121.63$" that is the value of Formula (2) will be described with reference to FIG. 5. FIG. 5 is a graph showing the relation between X values (i.e., values of (P1/P2×N1)) and falling strengths (MPa) of plugging portions in Examples 1 to 9 and Comparative Examples 1 to 5. In FIG. 5, the X-axis represents the value of (P1/P2×N1), and the Y-axis represents the falling strength (MPa) of plugging portions. As shown in FIG. 5, the relation between the value of (P1/P2×N1) and the falling strength (MPa) of plugging portions can be represented by a second approximation curve of X. The second approximation curve can be expressed by "$Y=-0.19X^2+11.33X-121.63$" that is the value of Formula (2). In the present invention, it has been focused on that X values around the point at which the curvature of the second approximation curve greatly changes, and it has been found that setting the value of Formula (2) to a range of 18.80 to 50.50 enables plugging portions to be effectively prevented from falling or breaking, thus completing the present disclosure.

The honeycomb filter of the present invention can be used as a filter trapping particulate matters in an exhaust gas.

1: partition wall, 2: cell, 2*a*: inflow cell, 2*b*: outflow cell, 3: circumferential wall, 4: honeycomb structure, 5: plugging portion, 11: inflow end face, 12: outflow end face, 100: honeycomb filter

What is claimed is:

1. A honeycomb filter comprising:
    a pillar-shaped honeycomb structure including porous partition walls provided to surround a plurality of cells serving as fluid passages extending from an inflow end face to an outflow end face; and
    porous plugging portions disposed on either one of end portions of each of the cells on the side of the inflow end face or the side of the outflow end face, wherein
    a porosity (%) of the partition walls is defined as P1,
    a porosity (%) of the plugging portions is defined as P2,
    an occupancy (%) of the partition walls relative to an area of a cross section orthogonal to an extending direction of the cells of the honeycomb structure is defined as N1,
    the P1 is 50 to 65%,
    the P2 is 60 to 70%,
    the N1 is 22 to 39%, and
    X represented by Formula (1) satisfies a relation of Formula (2):

$X = P1/P2 \times N1$,  Formula (1):

$18.80 \leq -0.19X^2 + 11.33X - 121.63 \leq 50.50$.  Formula (2):

2. The honeycomb filter according to claim 1, wherein a thickness of the partition walls is 0.178 to 0.318 mm.

3. The honeycomb filter according to claim 1, wherein a porosity ratio (P1/P2) being a ratio of P1 to P2 is 0.69 to 1.07.

4. The honeycomb filter according to claim 1, wherein a length of the plugging portions in the extending direction of the cells is 2 to 15 mm.

* * * * *